US 7,512,835 B2

United States Patent
Bartfai et al.

(10) Patent No.: US 7,512,835 B2
(45) Date of Patent: Mar. 31, 2009

(54) METHOD, SYSTEM AND ARTICLE OF MANUFACTURE FOR RECOVERY FROM A FAILURE IN A CASCADING PPRC SYSTEM

(75) Inventors: Robert F. Bartfai, Tucson, AZ (US); Michael E. Factor, Haifa, IL (US); Gail A. Spear, Tucson, AZ (US); William F. Micka, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 5 days.

(21) Appl. No.: 11/555,810

(22) Filed: Nov. 2, 2006

(65) Prior Publication Data

US 2007/0061531 A1 Mar. 15, 2007

Related U.S. Application Data

(62) Division of application No. 10/674,866, filed on Sep. 29, 2003, now Pat. No. 7,188,272.

(51) Int. Cl.
*G06F 11/00* (2006.01)
(52) U.S. Cl. ........................................................ 714/6
(58) Field of Classification Search ................. 714/6
See application file for complete search history.

(56) References Cited

U.S. PATENT DOCUMENTS

| | | | | |
|---|---|---|---|---|
| 5,155,845 A | * | 10/1992 | Beal et al. | 714/6 |
| 5,504,861 A | * | 4/1996 | Crockett et al. | 714/13 |
| 5,544,347 A | * | 8/1996 | Yanai et al. | 711/162 |
| 5,555,371 A | * | 9/1996 | Duyanovich et al. | 714/13 |
| 5,657,440 A | * | 8/1997 | Micka et al. | 714/16 |
| 5,720,029 A | * | 2/1998 | Kern et al. | 714/20 |
| 5,742,792 A | * | 4/1998 | Yanai et al. | 711/162 |
| 5,870,537 A | | 2/1999 | Kern et al. | |
| 5,889,935 A | * | 3/1999 | Ofek et al. | 714/6 |
| 6,304,980 B1 | * | 10/2001 | Beardsley et al. | 714/6 |
| 6,308,284 B1 | * | 10/2001 | LeCrone et al. | 714/6 |
| 6,463,501 B1 | * | 10/2002 | Kern et al. | 711/100 |
| 6,480,970 B1 | * | 11/2002 | DeKoning et al. | 714/6 |
| 6,490,596 B1 | | 12/2002 | Micka | |
| 6,499,112 B1 | | 12/2002 | Milillo et al. | |

(Continued)

FOREIGN PATENT DOCUMENTS

WO WO03028183 4/2003

*Primary Examiner*—Robert Beausoliel
*Assistant Examiner*—Amine Riad
(74) *Attorney, Agent, or Firm*—Dan Shifrin

(57) ABSTRACT

A method of recovery from a data storage system failure in a data storage system having a host computer writing data to a first storage unit with a first storage controller synchronously mirroring the data to a second storage unit, and with a second storage controller asynchronously mirroring the data to a third storage unit. Upon detection of an error or failure associated with the first storage unit, the synchronous data mirroring relationship between the first storage unit and the second storage unit is terminated and the host is directed to write data updates directly to the second storage unit. Upon correction of the failure associated the asynchronous mirroring of data updates from the second storage unit to the third storage unit is suspended and synchronous mirroring of the data updates in a reverse direction, from the second storage unit to the first storage unit, is commenced.

13 Claims, 8 Drawing Sheets

U.S. PATENT DOCUMENTS

| | | | |
|---|---|---|---|
| 6,654,912 B1 * | 11/2003 | Viswanathan et al. | 714/42 |
| 6,718,352 B1 * | 4/2004 | Dang et al. | 707/205 |
| 6,742,138 B1 * | 5/2004 | Gagne et al. | 714/6 |
| 6,772,303 B2 * | 8/2004 | Crockett et al. | 711/162 |
| 6,813,683 B2 * | 11/2004 | Tabuchi et al. | 711/112 |
| 6,842,825 B2 * | 1/2005 | Geiner et al. | 711/133 |
| 6,948,089 B2 * | 9/2005 | Fujibayashi | 714/6 |
| 7,017,076 B2 * | 3/2006 | Ohno et al. | 714/15 |
| 2004/0034808 A1 * | 2/2004 | Day et al. | 714/6 |
| 2004/0039959 A1 * | 2/2004 | LeCrone et al. | 714/6 |
| 2004/0260873 A1 * | 12/2004 | Watanabe | 711/114 |
| 2004/0260899 A1 * | 12/2004 | Kern et al. | 711/162 |

* cited by examiner

METHOD, SYSTEM AND ARTICLE OF MANUFACTURE FOR RECOVERY FROM A FAILURE IN A CASCADING PPRC SYSTEM

CROSS-REFERENCED APPLICATIONS

This application is a divisional application of, and claims priority from, commonly-assigned and co-pending U.S. patent Ser. No. 10/674,866, entitled METHOD, SYSTEM AND ARTICLE OF MANUFACTURE FOR RECOVERY FROM A FAILURE IN A CASCADING PPRC SYSTEM, filed Sep. 29, 2003, which application is incorporated herein by reference. This application also incorporates by reference commonly-assigned and co-pending U.S. patent Ser. No. 10/464,024, entitled METHOD, SYSTEM AND ARTICLE OF MANUFACTURE FOR REMOTE COPYING OF DATA, filed Jun. 6, 2003; and U.S. patent Ser. No. 10/674,872, entitled METHOD, SYSTEM, AND PROGRAM FOR RECOVERY FROM A FAILURE IN AN ASYNCHRONOUS DATA COPYING SYSTEM; Ser. No. 10/674,900 entitled AUTONOMIC INFRASTRUCTURE ENABLEMENT FOR POINT IN TIME COPY CONSISTENCY GROUPS; Ser. No. 10/675,289, entitled APPARATUS AND METHOD TO COORDINATE MULTIPLE DATA STORAGE AND RETREIVAL STORAGE SYSTEMS; Ser. No. 10/676,852, entitled METHOD, SYSTEM AND PROGRAM FOR FORMING A CONSISTENCY GROUP; Ser. No. 10/675,317, entitled METHOD, SYSTEM AND PROGRAM FOR ASYNCHRONOUS COPY; Ser. No. 10/674,845, entitled METHOD, SYSTEM, AND PROGRAM FOR MIRRORING DATA AMONG STORAGE SITES, all filed on Sep. 29, 2003.

TECHNICAL FIELD

The present invention relates to a method, system, and article of manufacture for recovery from a failure of a storage unit in a cascading PPRC system.

BACKGROUND ART

Information technology systems, including storage systems, may need protection from site disasters or outages, where outages may be planned or unplanned. Furthermore, information technology systems may require features for data migration, data backup, or data duplication. Implementations for disaster or outage recovery, data migration, data backup and data duplication may include mirroring or copying of data in storage systems. Such mirroring or copying of data may involve interactions among hosts, storage systems and connecting networking components of the information technology system.

An enterprise storage server (ESS), such as the IBM* TotalStorage Enterprise Storage Server*, may be a disk storage server that includes one or more processors coupled to storage devices, including high capacity scalable storage devices, Redundant Array of Independent Disks (RAID), etc. The enterprise storage servers are connected to a network and include features for copying data in storage systems.

Peer-to-Peer Remote Copy (PPRC) is an ESS function that allows the shadowing of application system data from a first site to a second site. The first site may be referred to as an application site, a local site, or a primary site. The second site may be referred to as a recovery site, a remote site or a secondary site. The logical volumes that hold the data in the ESS at the local site are called local volumes, and the corresponding logical volumes that hold the mirrored data at the remote site are called remote volumes. High speed links, such as ESCON links may connect the local and remote ESS systems.

In the synchronous type of operation for PPRC, i.e., synchronous PPRC, the updates done my a host application to the local volumes at the local site are synchronously shadowed onto the remote volumes at the remote site. As synchronous PPRC is a synchronous copying solution, write updates are ensured on both copies (local and remote) before the write is considered to be completed for the host application. In synchronous PPRC the host application does not get the "write complete" condition until the update is synchronously done in both the local and the remote volumes. Therefore, from the perspective of the host application the data at the remote volumes at the remote site is equivalent to the data at the local volumes at the local site.

Synchronous PPRC increases the response time as compared to asynchronous copy operation, and this is inherent to the synchronous operation. The overhead comes from the additional steps that are executed before the write operation is signaled as completed to the host application. Also, the PPRC activity between the local site and the remote site will be comprised of signals and data that travel through the links that connect the sites, and the overhead response time of the host application write operations will increase proportionally with the distance between the sites. Therefore, the distance affects a host application's response time. In certain implementations, there may be a maximum supported distance for synchronous PPRC operations referred to as the synchronous communication distance.

In the Extended Distance PPRC (also referred to as PPRC Extended Distance) method of operation, PPRC mirrors the updates of the local volume onto the remote volumes in an asynchronous manner, while the host application is running. In Extended Distance PPRC, the host application receives a write complete response before the update is copied from the local volumes to the remote volumes. In this way, when in Extended Distance PPRC, a host application's write operations are free of the typical synchronous overheads. Therefore, Extended Distance PPRC is suitable for remote copy solutions at very long distances with minimal impact on host applications. There is no overhead penalty upon the host application's write such as in synchronous PPRC. However, Extended Distance PPRC does not continuously maintain an equivalent copy of the local data at the remote site.

Further details of the PPRC are described in the IBM publication "IBM TotalStorage Enterprise Storage Server: PPRC Extended Distance," IBM document number SG24-6568-00 (Copyright IBM, 2002), which publication is incorporated herein by reference in its entirety.

Additional flexibility and safety in data storage can be achieved by combining synchronous PPRC and asynchronous Extended Distance PPRC elements in a single data storage system. Once such system is disclosed in co-pending and commonly assigned U.S. patent application Ser. No. 10/464,024, filed Jun. 17, 2003 entitled, "Method, System, and Article of Manufacture for Remote Copying of Data" which application is incorporated herein by reference in its entirety. The cascading data storage system described in U.S. patent application Ser. No. 10/464,024 features a first storage unit receiving data from the I/O operations of a host computer. A first storage controller is associated with the first storage unit which synchronously mirrors the data to a second storage unit associated with a second storage controller, which in turn asynchronously mirrors the data to a third storage unit. Typically, the first, second and third storage units are maintained at separate locations. It is common for the first storage unit to be maintained at the main application site. The second storage unit is often maintained at a bunker site near enough to the first storage unit to maintain an efficient synchronous PPRC relationship, but separated and protected from the first storage unit in order to decrease the chance that the first and second storage units would both be destroyed in a common disaster. The third storage unit can be located at any distance from the second storage unit.

As is discussed in U.S. application Ser. No. 10/464,024, return to full operation at the first storage unit after a failure can be accomplished by performing a full copy of all volumes maintained on the second or third storage units to the first storage unit. Unfortunately, a full volume copy may take hours depending upon the amount of data stored in the respective storage units. Therefore, a need exists in the art for a recovery method and apparatus that can be implemented that avoids the need for full copies of volumes to restore the configuration back to normal operation.

The present invention is directed to overcoming one or more of the problems discussed above.

SUMMARY OF THE INVENTION

The need in the art is addressed by a method of recovery from a data storage system failure in a data storage system having a host computer writing data to a first storage unit with a first storage controller synchronously mirroring the data to a second storage unit, and with a second storage controller asynchronously mirroring the data to a third storage unit. The method is triggered by the detection of a failure associated with the first storage unit. Upon detection of the error or failure associated with the first storage unit, the synchronous PPRC relationship between the first storage unit and the second storage unit is terminated and the host is directed to write data updates directly to the second storage unit. During the time period when the host begins writing updates to the second storage unit, the asynchronous PPRC relationship between the second storage unit and the third storage unit is maintained. Upon correction of the failure associated with the first storage unit, the asynchronous mirroring of data updates from the second storage unit to the third storage unit is suspended and synchronous mirroring of the data updates in a reverse direction, from the second storage unit to the first storage unit, is commenced. When a full duplex state is reached between the first storage unit and the second storage unit, host I/O operations can be quiesced. Subsequently, the synchronous PPRC relationship with the first storage volume mirroring data to the second storage unit may be reestablished and host I/O writes to the first storage unit may be resumed. Finally, the asynchronous PPRC relationship between the second storage unit and the third storage unit is reestablished and the data stored on the third storage volume is brought current with that maintained on the second storage volume.

Preferably, the data storage tracks associated with the second storage unit which contain mirrored data updates from the synchronous PPRC relationship with the first storage unit are identified by a first map, more specifically an out of synch (OOS) bitmap which represents updates that must be sent from the second to the third storage unit. Similarly, the data storage tracks associated with the second storage unit which contain data updates received when host I/O operations are writing data directly to the second storage volume, can be identified with a second map, specifically a change recording (CR) bitmap. The information contained in the OOS bitmap and the CR bitmap or copies thereof may be manipulated to allow recovery of the first storage volume, resynchronization of the third storage volume and return to normal operations after a failure associated with the first storage volume without the need for a full volume copy. In addition, host application downtime is minimized.

DETAILED DESCRIPTION OF THE PREFERRED EMBODIMENT

I. Detailed Description of Basic PPRC Three Site Implementation

In the following description, reference is made to the accompanying drawings which form a part hereof and which illustrate several implementations. It is understood that other implementations may be utilized and structural and operational changes may be made without departing from the scope of the present limitations.

Figure 1:
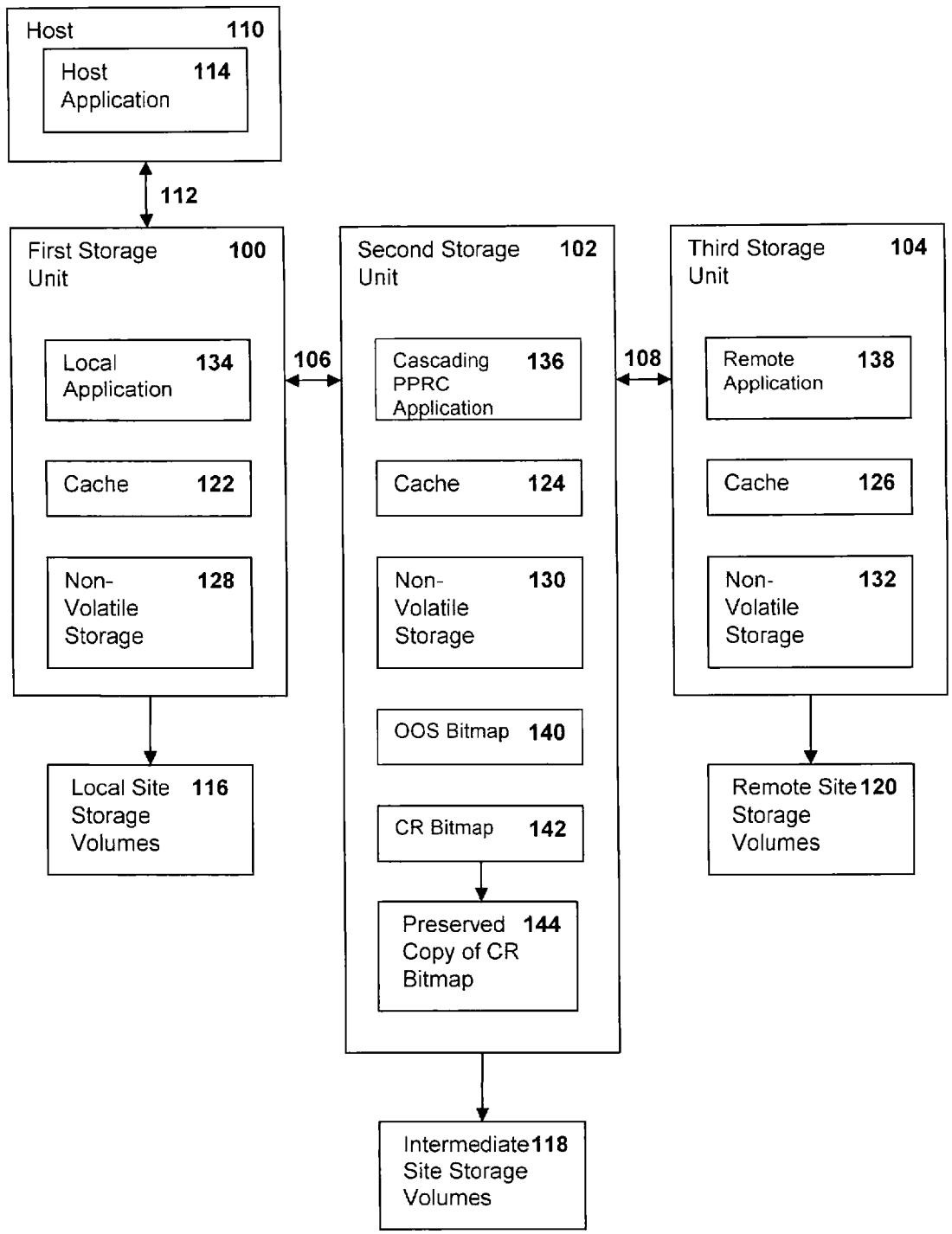
FIG. 1 illustrates a block diagram of a computing environment in accordance with certain described aspects of the invention.

FIG. 1 illustrates a computing environment utilizing three storage control units, such as a first storage unit 100, an second storage unit 102, and a third storage unit 104 connected by data interface channels 106, 108, such as the Enterprise System Connection (ESCON)* channel or any other data interface mechanism known in the art (e.g., fibre channel, Storage Area Network (SAN) interconnections, etc.).

The three storage control units 100, 102, 104 may be at three different sites with the first storage unit 100 and the second storage unit 102 being within a synchronous communication distance of each other. The synchronous communication distance between two storage control units is the distance up to which synchronous communication is feasible between the two storage control units. The third storage unit 104 may be a long distance away from the second storage unit 102 and the first storage unit 100, such that synchronous copying of data from the second storage unit 102 to the third storage unit 104 may be time consuming or impractical. Additionally, the second storage unit 102 may be in a secure environment separated from the first storage unit 100 and with separate power to reduce the possibility of an outage affecting both the first storage unit 100 and the second storage unit 102. Certain implementations of the invention create a three site (local, intermediate, remote) disaster recovery solution where there may be no data loss if the first storage unit 100 is lost. In the three site disaster recovery solution, the first storage unit 100 is kept at the local site, the second storage unit 102 is kept at the intermediate site, and the third storage unit 104 is kept at the remote site. Data copied on the second storage unit 102 or the third storage unit 104 may be used to recover from the loss of the first storage unit 100. In certain alternative implementations, there may be less than three sites. For example, the first storage unit 100 and the second storage unit 102 may be at the same site. In additional alternative implementations of the invention, there may be more than three storage control units distributed among three or more sites. Furthermore, functions of a plurality of storage control units may be integrated into a single storage control unit, e.g., functions of the first storage unit 100 and the second storage unit 102 may be integrated into a single storage control unit.

The first storage unit 100 is coupled to a host via data interface channel 112. While only a single host 110 is shown coupled to the first storage unit 100, in certain implementations of the invention, a plurality of hosts may be coupled to the first storage unit 100. The host 110 may be any computational device known in the art, such as a personal computer, a workstation, a server, a mainframe, a hand held computer, a palm top computer, a telephony device, network appliance, etc. The host 110 may include any operating system (not shown) known in the art, such as the IBM OS/390* operating system. The host 110 may include at least one host application 114 that sends Input/Output (I/O) requests to the first storage unit 100.

The storage control units 100, 102, 104 are coupled to storage volumes such as local site storage volumes 116, intermediate site storage volumes 118, and remote site storage volumes 120, respectively. The storage volumes 116, 118, 120 may be configured as a Direct Access Storage Device (DASD), one or more RAID ranks, just a bunch of disks (JBOD), or any other data repository system known in the art.

The storage control units 100, 102, 104 may each include a cache, such as cache 122, 124, 126. respectively. The caches 122, 124, 126 comprise volatile memory to store tracks. The storage control units 100, 102, 104 may each include a non-volatile storage (NVS), such as non-volatile storage 128, 130, 132, respectively. The non-volatile storage 128, 130, 132 elements may buffer certain modified tracks in the caches 122, 124, 126, respectively.

The first storage unit 100 additionally includes an application, such as a local application 134, for synchronous copying of data stored in the cache 122, non-volatile storage 128, and local site storage volumes 116 to another storage control unit, such as the second storage unit 102. The local application 134 includes copy services functions that execute in the first storage unit 100. The first storage unit 100 receives I/O requests from the host application 114 to read and write to the local site storage volumes 116.

The second storage unit 102 additionally includes an application such as a cascading PPRC application 136. The cascading PPRC application 136 includes copy services functions that execute in the second storage unit 102. The cascading PPRC application 136 can interact with the first storage unit 100 to receive data synchronously. The cascading PPRC application 136 can also send data asynchronously to the third storage unit 104. Therefore, the cascading PPRC application 136 cascades a first pair of storage control units formed by the first storage unit 100 and the second storage unit 102 and the third storage unit 104. In alternative implementations of the invention, additional storage control units may be cascaded.

The third storage unit 104 additionally includes an application, such as a remote application 138, that can receive data asynchronously from another storage control unit such as the second storage unit 102. The remote application 138 includes copy services functions that execute in the third storage unit 104.

The second storage unit 102 also includes an out of synch (OOS) bitmap 140. The OOS bitmap 140 identifies those tracks having changed data on the intermediate site storage volumes 118, said data having been changed as a result of the synchronous PPRC updates received from the first storage unit 100. In addition, the OOS bitmap 140, as will be discussed in detail below, can be used to identify those tracks associated with the intermediate site storage volumes 118 which have been updated directly by the host application 114. The second storage unit 102 also includes a change recording (CR) bitmap 142. The CR bitmap 142 is capable of being toggled creating a preserved copy of the CR bitmap 144 at a point in time. Like the OOS bitmap 140, the CR bitmap 142 identifies tracks associated with the intermediate site storage volumes 118 which contain changed or updated data.

Therefore, FIG. 1 illustrates a computing environment where a host application 114 sends I/O requests to a first storage unit 100. The first storage unit 100 synchronously copies data to the second storage unit 102, and the second storage unit 102 asynchronously copies data to the third storage unit 104.

Figure 2:
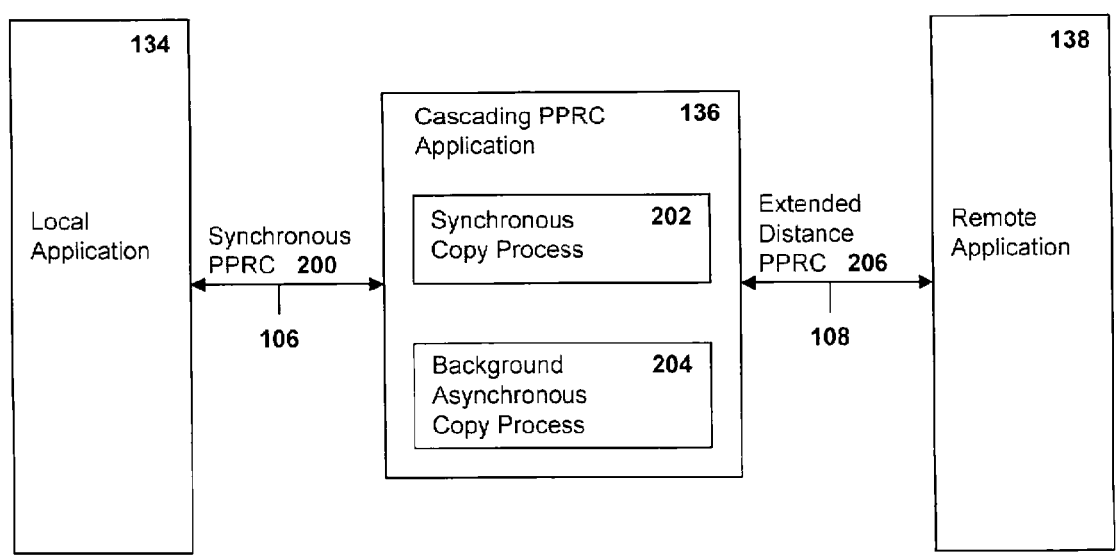
FIG. 2 illustrates a block diagram of a cascading copy application in accordance with certain described implementations of the invention.

FIG. 2 illustrates a block diagram that illustrates communications between the local application 134, the cascading PPRC application 136 and the remote application 138, in accordance with certain implementations of the invention.

The local application 134 performs a synchronous data transfer, such as via synchronous PPRC 200, to a synchronous copy process 202 that may be generated by the cascading PPRC application 136. The synchronous data transfer 200 takes place over the data interface channel 106.

A background asynchronous copy process 204 that may be generated by the cascading PPRC application 136 performs an asynchronous data transfer, such as via Extended Distance PPRC 206, to the remote application 138. The asynchronous data transfer takes place over the data interface channel 108.

Since data from the first storage unit 100 are copied synchronously to the second storage unit 102, the intermediate site storage volumes 118 may include a copy of the local site storage volumes 116. In certain implementations of the invention the distance between the first storage unit 100 and the second storage unit 102 is kept as close as possible to minimize the performance impact of synchronous PPRC. Data is copied asynchronously from the second storage unit 102 to the third storage unit 104. As a result, the effect of long distance on the host response time is eliminated.

Therefore, FIG. 2 illustrates how the cascading PPRC application 136 on the second storage unit 102 receives data synchronously from the first storage unit 100 and transmits data asynchronously to the third storage unit 104.

Figure 3:
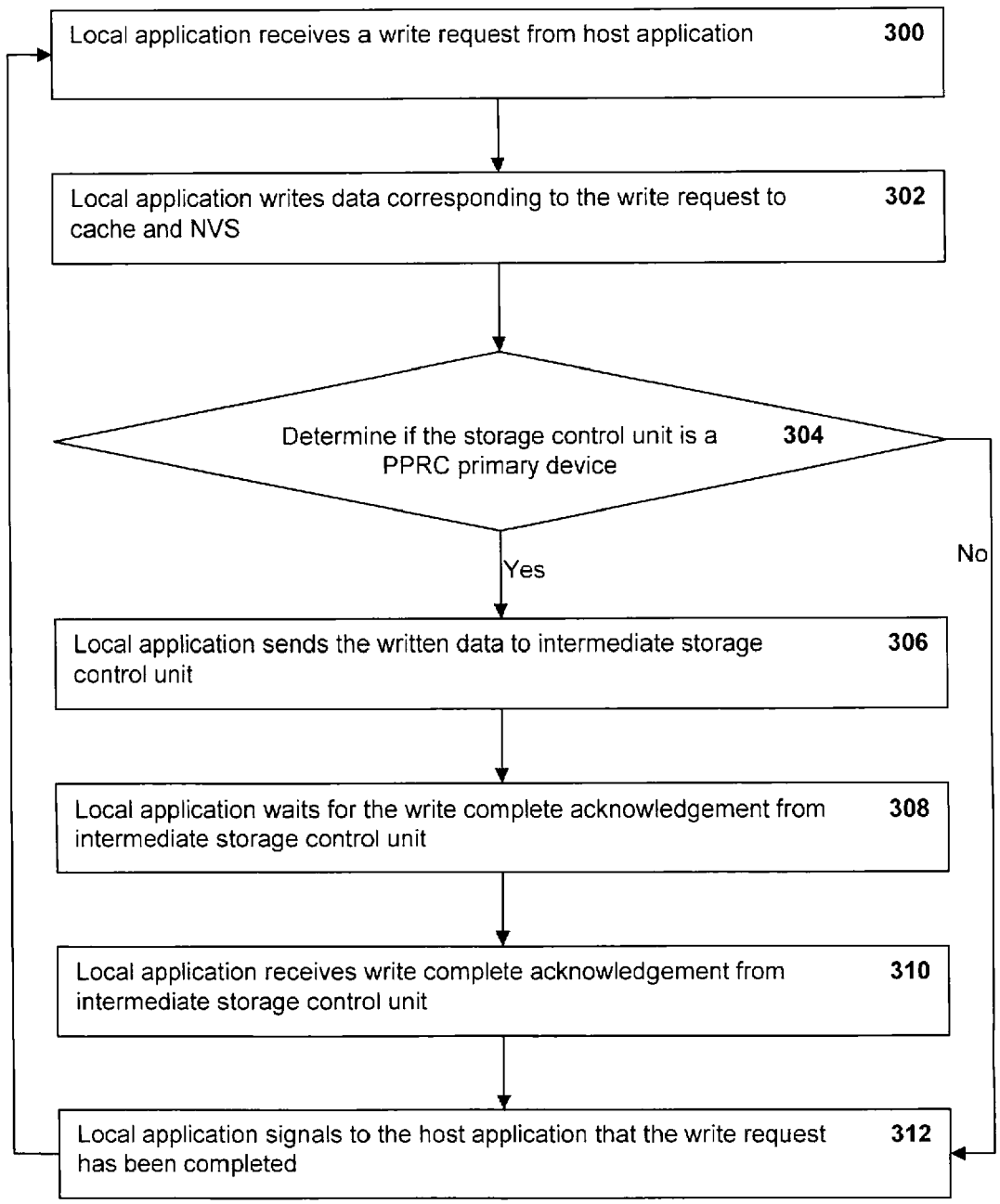
FIG. 3 illustrates logic implemented in a first storage unit in accordance with certain described implementations of the invention.

FIG. 3 illustrates logic implemented in the local storage unit 100 in accordance with certain implementations of the invention. Certain implementations of the invention of the logic of FIG. 3 may be implemented in the local application 134 resident in the first storage unit 100.

Control starts at block 300 where the local application 134 receives a write request from the host application 114. The local application 134 writes (at block 302) data corresponding to the write request on the cache 122 and the non-volatile storage 128 on the first storage unit 100. Additional applications (not shown) such as caching applications and non-volatile storage applications in the first storage unit 100 may manage the data in the cache 122 and the data in the non-volatile storage 128 and keep the data in the cache 122 and the non-volatile storage 128 consistent with the data in the local site storage volumes 116.

The local application 134 determines (at block 304) if the first storage unit 100 is a primary PPRC device, i.e., the first storage unit includes source data for a PPRC transaction. If so, the local application 134 sends (at block 306) the written data to the second storage unit 10 via a new write request. The local application 134 waits (at block 308) for a write complete acknowledgement from the second storage unit 102. The local application 134 receives (at block 310) a write complete acknowledgement from the second storage unit 102. Therefore, the local application 134 has transferred the data written by the host application 114 on the first storage unit 100 to the second storage unit 102 via a synchronous copy.

The local application 134 signals (at block 312) to the host application 114 that the write request from the host application 114 has been completed at the first storage unit 100. The local application 134 receives (at block 300) a next write request from the host application 114.

If the local application 134 determines (at block 304) that the first storage unit 100 is not a primary PPRC device, i.e., the first storage unit is not a source device for a PPRC transaction, then the local application 134 does not have to send any data to the second storage unit 102, and the local application 134 signals (at block 312) to the host application 114 that the write request from the host application 114 has been completed at the first storage unit 100.

Therefore, FIG. 3 illustrates a logic for receiving a write request from the host application 114 to the first storage unit 100 and synchronously copying the data corresponding to the write request from the first storage unit 100 to the second storage unit 102. The host application 114 waits for the write request to be completed while the synchronous copying of the data takes place. Since the first storage unit 100 and the second storage unit 102 are within a synchronous communication distance of each other, the synchronous copying of data from the first storage unit 100 to the second storage unit 102 takes a smaller amount of time when compared to the situation where the first storage unit 100 is beyond a synchronous communication distance to the second storage unit 102. Since the copy of the data on the second storage unit 102 is written synchronously, the second storage unit 102 includes an equivalent copy of the data on the first storage unit 100.

Figure 4:
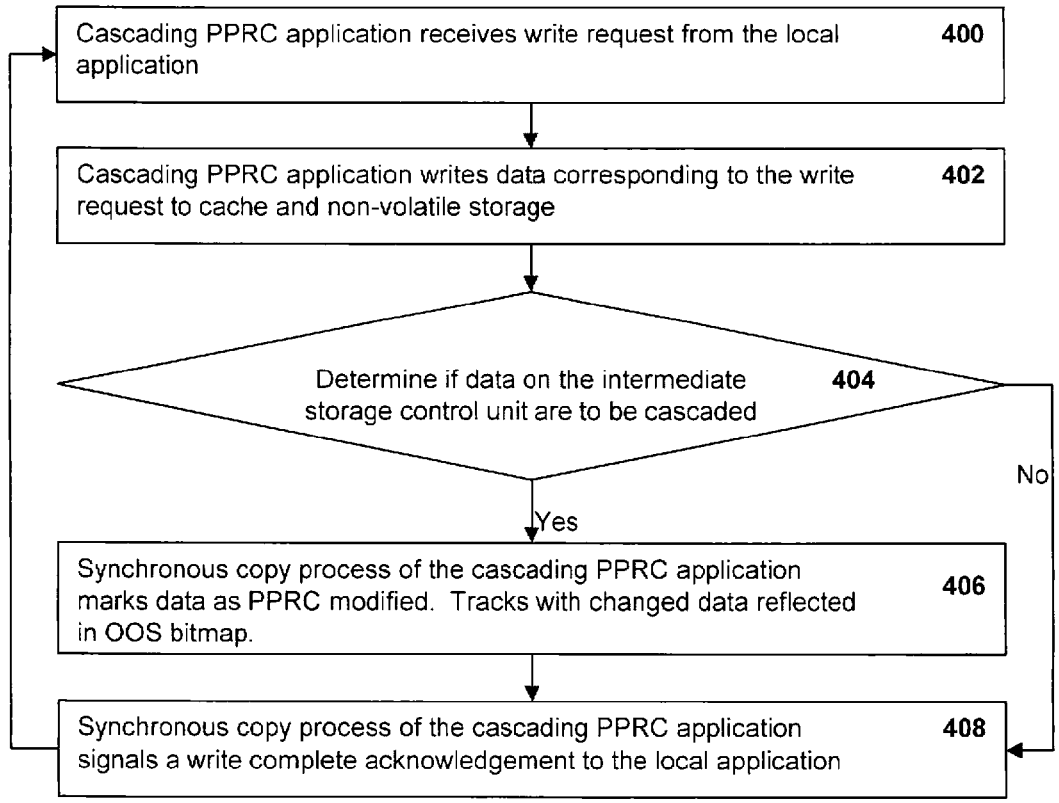
FIG. 4 illustrates logic for receiving data synchronously as implemented in an second storage unit in accordance with certain described implementations of the invention.

FIG. 4 illustrates logic for receiving data synchronously as implemented in the second storage unit 102 in accordance with certain implementations of the invention. The cascading PPRC application 136 may perform the logic illustrated in FIG. 4.

Control starts at block 400 where the cascading PPRC application 136 receives a write request from the local application 134. For example, the write request sent at block 306 of FIG. 3 to the second storage unit 102 may be received by the cascading PPRC application 136. The cascading PPRC application 136 writes (at block 402) data corresponding to the write request to the cache 124 and the non-volatile storage 130. The second storage unit 102 may keep the cache 124 and the non-volatile storage 130 consistent with the intermediate storage volumes 118.

The cascading PPRC application 136 determines (at block 404) if data on the second storage unit 102 is to be cascaded, i.e. the data is set to be sent to the third storage unit 104. If so, the synchronous copy process 202 of the cascading PPRC application 136 marks (at block 406) data as PPRC modified. The synchronous copy process 202 of the cascading PPRC application 136 signals (at block 408) a write complete acknowledgement to the local application 134. The cascading PPRC application 136 receives (at block 400) the next write request from the local application 134.

If the cascading PPRC application 136 determines (at block 404) that data on the second storage unit 102 does not have to be cascaded, then the synchronous copy process 202 of the cascading PPRC application 136 signals (at block 408) a write complete acknowledgement to the local application 134 and the cascading PPRC application 136 receives (at block 400) the next request from the local application 134.

Therefore, FIG. 4 illustrates how the second storage unit 102 receives a write request from the first storage unit 100 where the write request responds to a host write request. The second storage unit 102 marks data corresponding to the host write request as PPRC modified.

Figure 5:
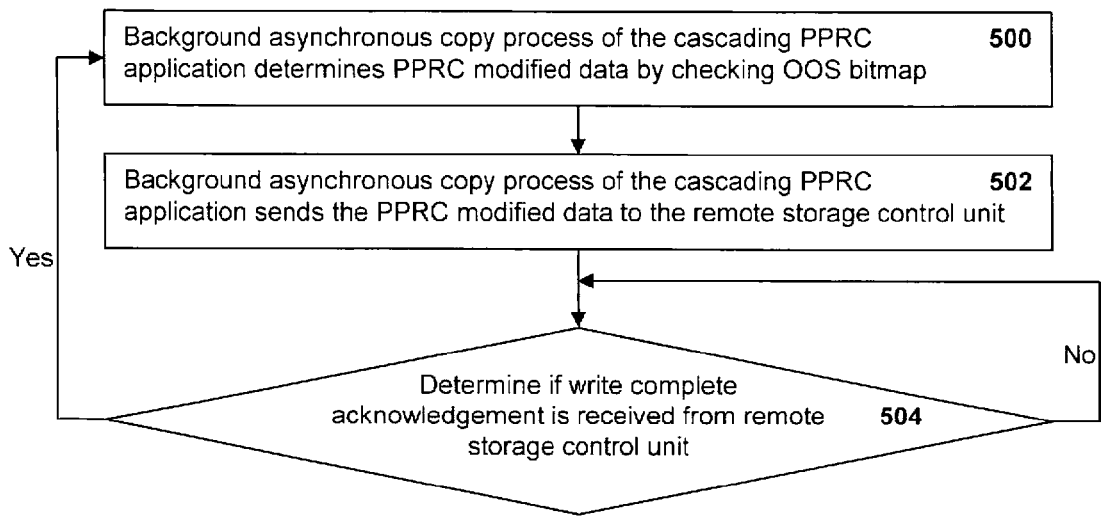
FIG. 5 illustrates logic for copying data asynchronously as implemented in the second storage unit in accordance with certain described implementations of the invention.

FIG. 5 illustrates logic for copying data asynchronously as implemented in the second storage unit 102 in accordance with certain implementations of the invention. The logic illustrated in FIG. 5 may be performed by the background asynchronous copy process 204 of the cascading PPRC application 136.

Control starts at block 500 where the background asynchronous copy process 204 of the cascading PPRC application 136 determines the PPRC modified data stored in the cache 124, non-volatile storage 130, and the intermediate site storage volumes 118 of the second storage unit 102.

The background asynchronous copy process 204 of the cascading PPRC application 136 sends (at block 502) the PPRC modified data to the third storage unit 104 asynchronously, i.e., the background asynchronous copy process 204 keeps sending the PPRC modified data stored in the cache 124, non-volatile storage 130, and the intermediate site storage volumes 118 of the second storage unit 102.

After the PPRC modified data has been sent, the background asynchronous copy process 204 determines (at block 504) if the write complete acknowledgement has been received from the third storage unit 104. If not, the background asynchronous copy process 204 again determines (at block 504) if the write complete acknowledgement has been received.

If after all PPRC modified data has been sent, the background asynchronous copy process 204 determines (at block 504) that write complete acknowledgement has been received from the third storage unit 104 then the background asynchronous copy process 204 determines (at block 500) the PPRC modified data once again.

The logic of FIG. 5 illustrates how the background asynchronous copy process 204 while executing in the background copies of data asynchronously from the second storage unit 102 to the third storage unit 104. Since the copying is asynchronous, the second storage unit 102 and the third storage unit 104 may be separated by long distances, such as the extended distances allowed by Extended Distance PPRC.

In certain implementations of the invention, if the first storage unit 100 stops sending updates to the second storage unit 102 because of an outage at the local site that has the first storage unit 100, then the background asynchronous copy process 204 may quickly complete the copy of all remaining modified data to the third storage unit 104. At the completion of the copy, the remote site storage volumes 120 will include an equivalent copy of all updates up to the time of the outage. If there are multiple failures such that both the first storage unit 100 and the second storage unit are lost, then there may be data loss at the remote site.

Since the third storage unit 104 is updated asynchronously, the data on the third storage unit 104 may not be equivalent to the data on the first storage unit 100 unless all of the data from the second storage unit 102 has been copied up to some point in time. To maintain an equivalent copy of data at the third storage unit 104 in case of failure of both the first storage unit 100 and the second storage unit 102, certain implementations of the invention may force the data at the third storage unit to contain all dependent updates up to some specified time. The consistent copy at the third storage unit 104 may be preserved via a point in time copy, such as FlashCopy*. One method may include quiescing the host I/O temporarily at the local site while the third storage unit 104 catches up with the updates. Another method may prevent writes to the second storage unit 102 while the third storage unit 104 catches up with the updates.

The implementations create a long distance disaster recovery solution by first copying synchronously from a first storage unit to an second storage unit and subsequently copying asynchronously from the second storage unit to a third storage unit. The distance between the first storage unit and the second storage unit may be small enough such that copying data synchronously does not cause a significant performance impact on applications that perform I/O operations on the first storage unit.

In implementations of the invention, if either the first storage unit 100 or data on the first storage unit 100 is lost, then the data can be recovered from replicated copies of the data on either the second storage unit 102 or the remote control storage unit 104. In certain implementations, it may be preferable to recover the data from the second storage unit 102 as the data on the second storage unit 102 is always equivalent to the data on the first storage unit 100 since data is copied synchronously from the first storage unit 100 to the second storage unit 102.

The described techniques may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium (e.g., magnetic storage medium such as hard disk drives, floppy disks, tape), optical storage (e.g., CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which implementations are made may further be accessible through a transmission media or from a file server over a network. Of course, those skilled in the art will recognize that many modifications may be made to this configuration without departing from the scope of the implementations and that the article of manufacture may comprise any information bearing medium known in the art.

In alternative implementations of the invention, the data transfer between the first storage unit 100 and the second storage unit 102 may be via Extended Distance PPRC. However, there may be data loss if there is an outage at the first storage unit 100. Additionally, in alternative implementations of the invention the data transfer between the second storage unit 102 and the third storage unit 104 may be via synchronous PPRC. However, there may be performance impacts on the I/O from the host 110 to the first storage unit 100.

In alternative implementations of the invention, the functions of the first storage unit 100 and the second storage unit 102 may be implemented in a single storage control unit. Furthermore, in additional implementations of the invention there may be more than three storage control units cascaded to each other. For example, a fourth storage control unit may be coupled to the third storage unit 104 and data may be transferred from the third storage unit 104 to the fourth storage control unit. In certain implementations of the invention, a chain of synchronous data transfers and a chain of asynchronous data transfers may take place among a plurality of cascaded storage control units. Furthermore, while the implementations have been described with storage control units, the storage control units may be any storage unit known in the art.

The logic of FIGS. 3, 4, and 5 describe specific operations occurring in a particular order. Further, the operations may be performed in parallel as well as sequentially. In alternative implementations, certain of the logic operations may be performed in a different order, modified, or removed and still implement implementations of the present invention. Moreover, steps may be added to the above described logic and still conform to the implementations. Yet further steps may be performed by a single process or distributed processes.

Many of the software and hardware components have been described in separate modules for purposes of illustration. Such components may be integrated into a fewer number of components or divided into a larger number of components. Additionally, certain operations described as performed by a specific component may be performed by other components.

Therefore, the foregoing description of the implementations has been presented for the purposes of illustration and description. It is not intended to be exhaustive or to limit the invention to the precise form disclosed. Many modifications and variations are possible in light of the above teaching. It is intended that the scope of the invention be limited not by this detailed description but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

II. Recovery from a Failure of the First Storage Unit

Figure 6:
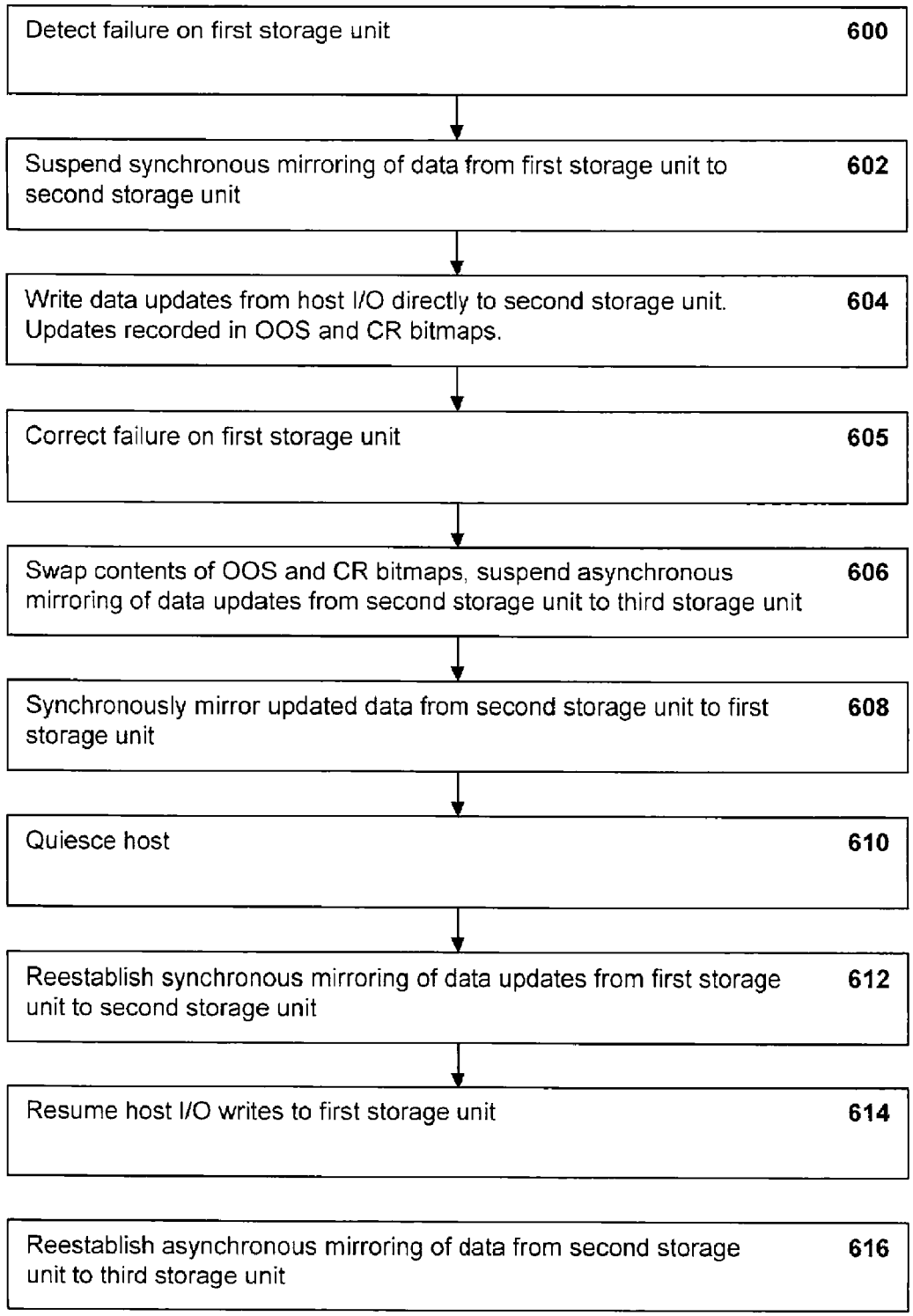
FIG. 6 illustrates a block diagram of a method of recovering from a failure to the first storage unit which does not require a full volume copy.
Figure 7:
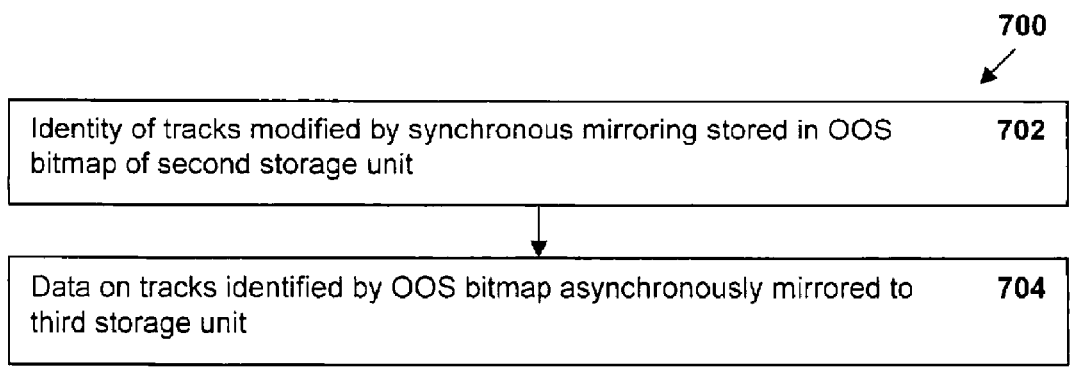
FIG. 7 illustrates a block diagram of the bitmap manipulation associated with asynchronous PPRC mirroring of data from the second storage unit to the third storage unit.

A generalized illustration of a method for recovery from a failure associated with the first storage unit 100 is shown in FIG. 6. If the local (or primary) site fails, the balance of the data storage system is initially unaware of the failure. High availability cluster multi-processing (HACMP) or other management software detects the loss of the first storage unit 100 (step 600). Meanwhile, the Extended Distance PPRC relationship causing the asynchronous mirroring of data from the second storage unit 102 to the third storage unit 104 is intact and operational. Specifically, the PPRC relationship between the second storage unit 102 and the third storage unit 104 is accomplished as is shown in FIG. 7. The identity of data tracks associated with the second storage unit 102 which have been modified by the synchronous mirroring of data prior to the failure of the first storage unit 100 are reflected in an out of synch (OOS) bitmap 140 (step 702). Continuously, data on tracks identified by the OOS bitmap 140 is asynchronously mirrored to the third storage unit (step 704). The OOS bitmap 140 will be employed in the recovery method in a new function to allow recovery of the first storage unit 100 without a full volume copy.

Figure 8:
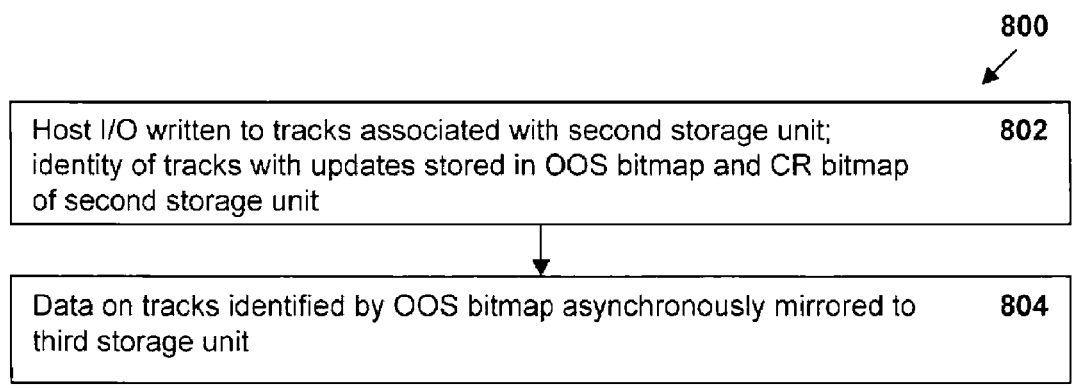
FIG. 8 illustrates a block diagram of the bitmap manipulation occurring when data updates are written directly to the second storage unit.

Upon detection of the failure associated with the first storage unit, the recovery program issues a command to the second storage unit 102 which can be a FAILOVER command suspending the synchronous mirroring of data from the first storage unit 100 to the second storage unit 102 (step 602). However, the direction of the synchronous PPRC pair (first storage unit 100 to second storage unit 102) is not reversed at this time. The host application 114 is directed to write data updates directly to the second storage unit 102 (step 604). These updates written from the host 110 to the second storage unit 102 are reflected in the existing OOS bitmap 140. In addition, changes to tracks associated with the second storage unit 102 are also reflected in a change recording (CR) bitmap 142 (FIG. 8, step 802), set up as a result of the FAILOVER command.

After the commencement of host I/O updates being written directly to the second storage unit 102 along with the associated tracking of changes to the second storage unit 102 (steps 604, 802), the failure associated with the first storage unit 100 can be corrected. During the time period where corrections to the first storage unit are occurring, writes to the second storage unit 120 assure that minimal or no data is lost and normal operations can continue.

Prior to the time host I/O operations to the first storage unit 100 are resumed, the data stored on the first storage unit 100 must be synchronized with the data stored on the second storage unit 102. A preferred method of accomplishing this synchronization which avoids host I/O interruption or a full volume data copy is to use the OOS bitmap 140 and CR bitmap 142 and a reverse PPRC synchronous mirroring operation to synchronize the first storage unit. Since the OOS bitmap 140 is necessary to the asynchronous mirroring of data updates from the second storage unit 102 to the third storage unit 104 (steps 702, 704), it is necessary to initially suspend the asynchronous mirroring of data updates from the second storage unit 102 to the third storage unit 104 (step 606) prior to synchronizing the first storage unit 100. Then, updates stored on the second storage unit 102 can be synchronously mirrored to the first storage unit 100 (step 608).

Prior to resynchronization of the first storage unit 100, the relationship between the second storage unit 102 and the third storage unit 104 must be suspended (step 901). The resynchronization of the first storage unit is a two step process. First, changed data written by the host application 114 to the second storage unit 102 while the first storage unit 100 was not operational is copied to the first storage unit 100. This changed data is stored on tracks associated with the second storage unit 102 and reflected in the OOS bitmap associated with the second storage unit 102. During resynchronization, a first pass is made through the OOS bitmap and updates are copied to the first storage unit 100. During the first pass, host writes are not sent to the first storage unit 100, but are recorded in the OOS bitmap associated with the second storage unit 102. Then, a second pass is made through the OOS bitmap. During the second pass, host writes are sent synchronously from the second storage unit 102 to the first storage unit 100.

Figure 9:
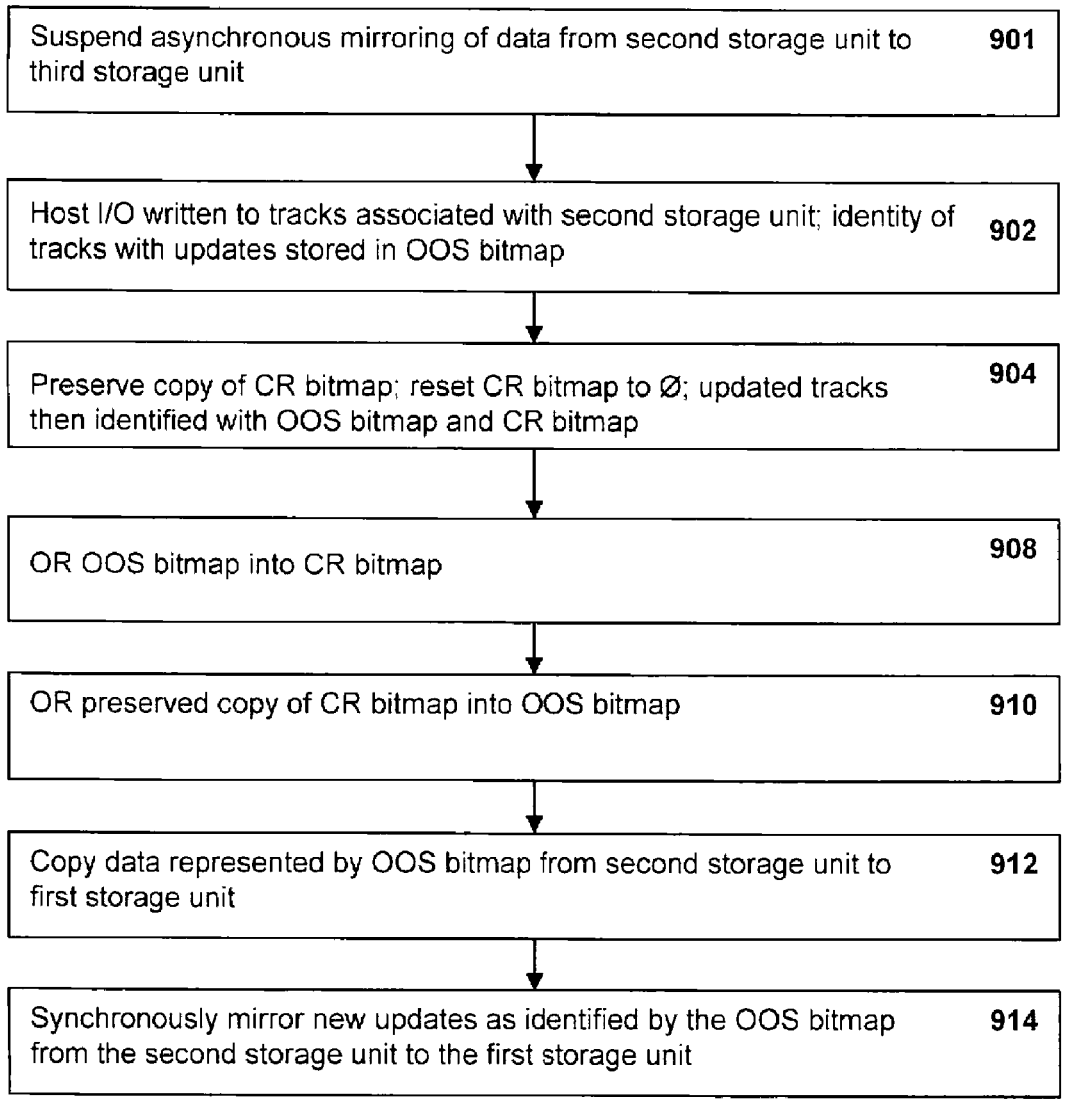
FIG. 9 illustrates a block diagram of the bitmap manipulation occurring when data updates are synchronously mirrored from the second storage unit to the first storage unit.

A method which avoids terminating host I/O operations during the bitmap manipulations necessary to resynchronize the first storage unit 100 is illustrated in FIG. 9.

At the beginning of the bitmap manipulation, host I/O operations are writing changed data to tracks associated with the second storage unit 102. The identity of the tracks with updated data stored therein is reflected in both the OOS bitmap 140 and the CR bitmap 142 (step 902) at the second storage unit 102. Next, the recovery program can issue a command to the second storage unit 102 which causes a swap of the contents of the CR and OOS bitmaps 142, 140. This command can be a FAILBACK command. The second storage unit 102 is marked with a special indicator "primed for resynch" in preparation for the resynchronization between the second and third units 102, 104 at the end of the process. Also, as part of the recovery command, the resynchronization between the second and first storage units 102, 100 is started using the new swapped contents of the OOS bitmap 140 associated with the second storage unit 102 to determine which tracks to send. Throughout this process, host writes continue to be recorded in both the OOS bitmap 140 and the CR bitmap 142. The OOS bitmap 140 records differences between the second and first units 100, 102, and the CR bitmap records differences between the second and third storage units 102, 104.

Once the bitmaps have been manipulated as described above, changed data on tracks reflected by the OOS bitmap 140 can be copied from the second storage unit 102 to the first storage unit 100 (step 912) while new updates are synchronously mirrored from the second storage unit 102 to the first storage unit 100 until a full duplex between the storage units is reached (step 914).

When the recovery program determines that the first storage unit 100 is fully synchronized with the second storage unit 102 (they are in "full duplex"), host writes are no longer recorded in the OOS bitmap 140. Host writes that must be accounted on behalf of the third storage unit 104 are still recorded in the CR bitmap 142.

At this point in the process, host I/O operations must be quiesced to allow the PPRC relationship between the first storage unit 100 and the second storage unit 102 to be reestablished and to allow host I/O to be swapped back to the first storage unit 100 (step 610). After host I/O is swapped back to the first storage unit 100 (step 614), the asynchronous PPRC relationship between the second storage unit 102 and the third storage unit 104 may be reestablished (step 616).

Figure 10:
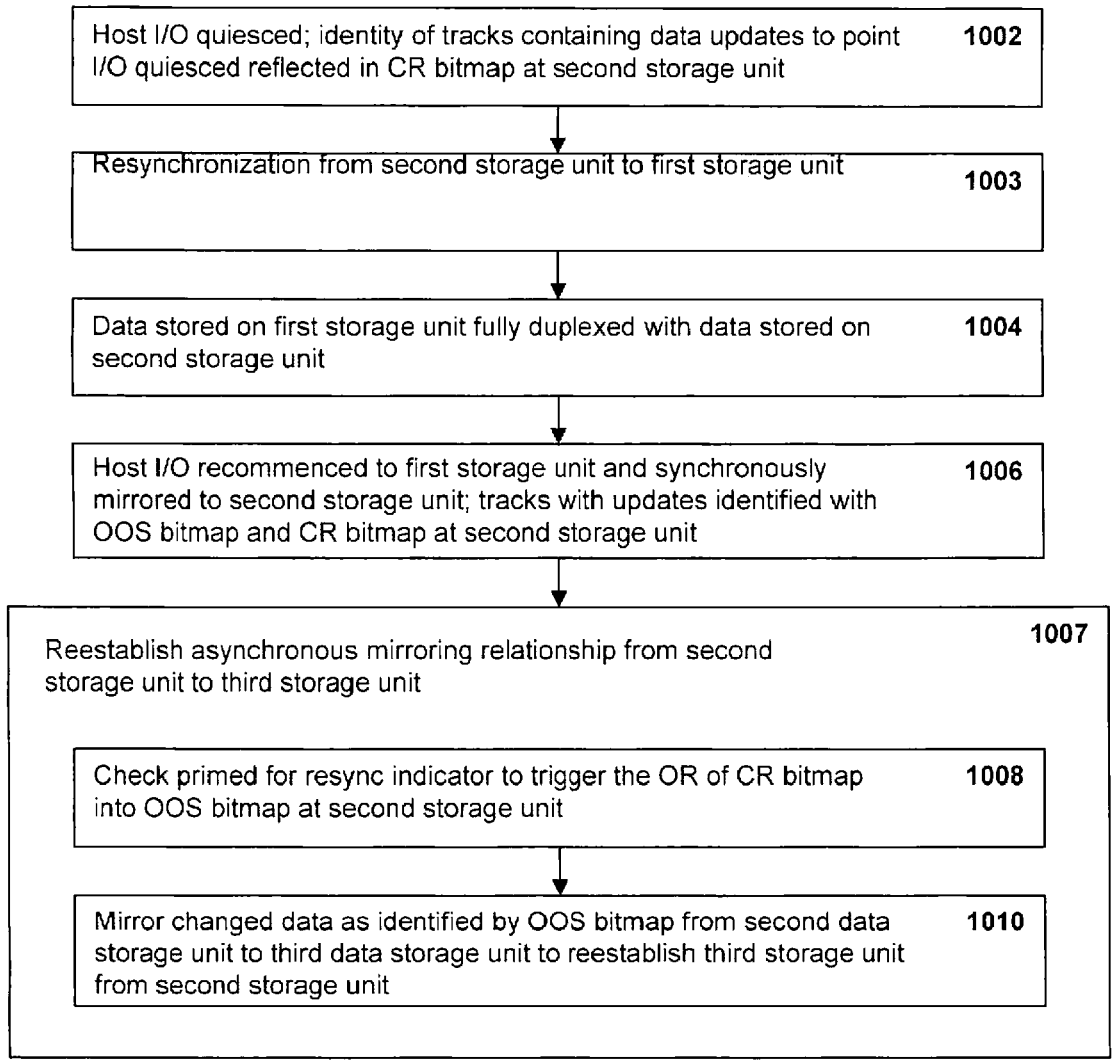
FIG. 10 illustrates a block diagram of the bitmap manipulation occurring when the asynchronous PPRC relationship is reestablished and the third data storage unit is synchronized.

Specifically, reestablishment of the asynchronous mirroring relationship from the second storage unit 102 to the third storage unit 104 occurs as is shown in FIG. 10 (step 1007). The recovery program is triggered to compare the CR bitmap 142 to the OOS bitmap 140 by the "primed for resync" indicator set by the FAILBACK command used to start the resynchronization of the first storage unit 100 and the second storage unit 102. Both bitmaps are associated with the second storage unit 102, and have been tracking data changes written synchronously to the second storage unit 102 since the recommencement of host I/O operations to the first storage unit 100. Next, the recovery program must add the identity of tracks containing changed data as identified by the CR bitmap 142 but not identified by the OOS bitmap 140 to the OOS bitmap 140 (step 1008). Then, changed data as identified by the OOS bitmap 140 can be mirrored from the second storage unit 102 to the third storage unit 102 (step 1010).

The described techniques for recovery from a failure in a cascading PPRC system may be implemented. The described techniques may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium (e.g., magnetic storage medium such as hard disk drives, floppy disks, tape), optical storage (e.g., CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. Of course, those skilled in the art will recognize that many modifications may be made to this configuration without departing from the scope of the implementations and that the article of manufacture may comprise any information bearing medium known in the art.

The objects of the invention have been fully realized through the embodiments disclosed herein. Those skilled in the art will appreciate that the various aspects of the invention may be achieved through different embodiments without departing from the essential function of the invention. The particular embodiments are illustrative and not meant to limit the scope of the invention as set forth in the following claims.

What is claimed is:

1. A method of recovery from a data storage system failure in a data storage system having a host computer writing data to a first storage unit associated with a first storage controller synchronously mirroring the data to a second storage unit associated with a second storage controller asynchronously mirroring the data to a third storage unit, the second storage controller comprising a first map identifying tracks storing the mirrored data which has been received on the second storage unit by the synchronous mirroring of the data from the first storage unit and a second map identifying the tracks storing changed data from a point in time where the host computer begins writing the data updates directly to the second storage unit, the method comprising:
   detecting a failure associated with the first storage unit;
   writing data updates directly from the host to the second storage unit;
   correcting the failure associated with the first storage unit;
   suspending the asynchronous mirroring of the data updates from the second storage unit to the third storage unit before the data updates are synchronously mirrored from the second storage unit to the first storage unit;
   re-establishing the synchronous mirroring of the data from the first storage unit to the second storage unit;
   resuming the writing of the data from the host computer to the first storage unit; and
   re-establishing the asynchronous mirroring of data from the second storage unit to the third storage unit by:
      comparing the second map to the first map and adding the identity of the tracks containing the changed data, as identified by the second map but not identified by the first map, to the first map; and
      asynchronously mirroring the data updates on the tracks then identified by the first map from the second storage unit to the third storage unit; and
   synchronously mirroring the data updates from the second storage unit to the first storage unit.

2. The method of claim 1 further comprising suspending the synchronous mirroring of the data from the first storage unit to the second storage unit upon detection of the failure associated with the first storage unit.

3. A system for copying stored data and having the ability to recover from a failure, comprising:
   a second storage controller associated with a second storage unit, the second storage controller synchronously receiving mirrored data from a first storage controller associated with a host computer and a first storage unit, the second storage controller further asynchronously mirroring the data to a third storage controller associated with a third storage unit, the second storage controller further comprising a first map identifying tracks storing the mirrored data which has been received on the second storage unit by the synchronous mirroring of the data from the first storage unit and a second map identifying the tracks storing changed data from a point in time where the host computer begins writing the data updates directly to the second storage unit;
   means for detecting a failure associated with the first storage unit;
   means for writing data updates directly from the host computer to the second storage controller upon detection of the failure associated with the first storage unit;
   means for correcting the failure associated with the first storage unit;
   means for suspending the asynchronous mirroring of the data updates from the second storage unit to the third storage unit before the data updates are synchronously mirrored from the second storage unit to the first storage unit;
   means for re-establishing the synchronous mirroring of the data from the first storage unit to the second storage unit;
   means for resuming the writing of the data from the host computer to the first storage unit; and
   means for re-establishing the asynchronous mirroring of data from the second storage unit to the third storage unit by:
      comparing the second map to the first map and adding the identity of the tracks containing the changed data, as identified by the second map but not identified by the first map, to the first map; and
      asynchronously mirroring the data updates on the tracks then identified by the first map from the second storage unit to the third storage unit; and
   means for synchronously mirroring the data updates from the second storage unit to the first storage unit upon correction of the failure associated with the first storage unit.

4. The system for copying stored data of claim 3 wherein the second storage controller further comprises means for terminating the asynchronous mirroring of the data updates from the second storage unit to the third storage unit upon the commencement of the synchronous mirroring of the data updates from the second storage unit to the first storage unit.

5. The system for copying stored data of claim 4 wherein the second storage controller further comprises:
   means for re-establishing the asynchronous mirroring of the data to from the second storage unit to the third storage unit after re-commencement of the synchronous mirroring of the data updates from the second storage unit to the first storage unit; and
   means for synchronizing the data stored on the third storage unit with the data stored on the second storage unit.

6. An article of manufacture for use in programming a data storage system to recover from a failure, the data storage system having a host computer writing data to a first storage unit associated with a first storage controller synchronously mirroring the data to a second storage unit associated with a second storage controller asynchronously mirroring the data to a third storage unit, the second storage controller comprising a first map identifying tracks storing the mirrored data which has been received on the second storage unit by the synchronous mirroring of the data from the first storage unit and a second map identifying the tracks storing changed data from a point in time where the host computer begins writing the data updates directly to the second storage unit, the article of manufacture comprising a storage medium having logic embedded therein to cause components of the data storage system to:

detect a failure associated with the first storage unit;

write data updates directly from the host to the second storage unit;

correct the failure associated with the first storage unit;

suspend the asynchronous mirroring of the data updates from the second storage unit to the third storage unit before the data updates are synchronously mirrored from the second storage unit to the first storage unit;

re-establish the synchronous mirroring of the data from the first storage unit to the second storage unit;

resume the writing of the data from the host computer to the first storage unit; and re-establish the asynchronous mirroring of data from the second storage unit to the third storage unit by:

comparing the second map to the first map and adding the identity of the tracks containing the changed data, as identified by the second map but not identified by the first map, to the first map; and asynchronously mirroring the data updates on the tracks then identified by the first map from the second storage unit to the third storage unit; and synchronously mirror the data updates from the second storage unit to the first storage unit.

7. The article of manufacture of claim 6 wherein the logic further causes components of the data storage system to suspend the synchronous mirroring of the data from the first storage unit to the second storage unit upon detection of the failure associated with the first storage unit.

8. The article of manufacture of claim 6 wherein the logic further causes asynchronous mirroring of the data from the second storage unit to the third storage unit by:

creating the first map; and periodically transmitting batches of the mirrored data on tracks identified by the first map from the second storage unit to the third storage unit.

9. The article of manufacture of claim 8 wherein the logic further causes synchronous mirroring of the data updates from the second storage unit to the first storage unit by:

creating the second map;

copying to the first storage unit the changed data on the tracks identified by the second map; and synchronously mirroring to the first storage unit further changed data written to the second storage unit by the host computer until a full duplex state between the first storage unit and the second storage unit is reached.

10. The article of manufacture of claim 9 wherein the logic further causes copying of the changed data on the tracks identified by the second map to the first storage unit by:

preserving a copy of the second map at a point in time at which copying the changed data to the first storage unit begins;

re-setting the second map to a clear state and thereafter identifying the tracks containing the changed data in the second map;

comparing the first map to the second map and adding the identity of the tracks containing the data updates, as identified by the first map but not identified by the second map, to the second map;

comparing the preserved copy of the second map to the first map and adding the identity of the tracks containing the changed data, as identified by the preserved copy of the second map but not identified by the first map, to the first map; and copying the data updates on the tracks then identified by the first map from the second storage unit to the first storage unit.

11. The article of manufacture of claim 9 wherein the logic further causes synchronous mirroring to the first storage unit further updates written to the second storage unit by the host computer by:

continuing to identify tracks having the data updates with the first map and with the second map; and synchronously copying the data updates on the tracks identified by the first map from the second storage unit to the first storage unit.

12. The article of manufacture of claim 9 wherein the logic further causes components of the data storage system to take the following steps when the full duplex state between the first storage unit and the second storage unit is reached:

terminate the use of the first map to identify the tracks associated with the second storage unit storing the data updates; and continue to use the second map to identify the tracks associated with the second storage unit storing changed data.

13. The article of manufacture of claim 9 wherein the logic further causes components of the data storage system to stop the writing of data by the host computer after the full duplex state between the first storage unit and the second storage unit is reached.

\* \* \* \* \*